United States Patent
Holland et al.

(10) Patent No.: US 10,602,174 B2
(45) Date of Patent: Mar. 24, 2020

(54) LOSSLESS PIXEL COMPRESSION FOR RANDOM VIDEO MEMORY ACCESS

(71) Applicant: INTEL CORPORATION, Santa Clara, CA (US)

(72) Inventors: James M. Holland, Folsom, CA (US); Scott W. Cheng, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 15/412,397

(22) Filed: Jan. 23, 2017

(65) Prior Publication Data

US 2018/0041766 A1  Feb. 8, 2018

Related U.S. Application Data

(60) Provisional application No. 62/371,133, filed on Aug. 4, 2016.

(51) Int. Cl.
| | | |
|---|---|---|
| *H04N 19/50* | (2014.01) | |
| *H04N 19/426* | (2014.01) | |
| *H04N 19/65* | (2014.01) | |
| *H04N 19/593* | (2014.01) | |
| *H04N 19/182* | (2014.01) | |
| *H04N 19/184* | (2014.01) | |
| *H04N 19/423* | (2014.01) | |
| *H04N 19/40* | (2014.01) | |

(52) U.S. Cl.
CPC ........... *H04N 19/50* (2014.11); *H04N 19/182* (2014.11); *H04N 19/184* (2014.11); *H04N 19/40* (2014.11); *H04N 19/423* (2014.11); *H04N 19/426* (2014.11); *H04N 19/593* (2014.11); *H04N 19/65* (2014.11)

(58) Field of Classification Search
CPC .... H04N 19/50; H04N 19/182; H04N 19/184; H04N 19/40; H04N 19/423; H04N 19/426; H04N 19/593; H04N 19/65
USPC ..................................................... 375/240.12
See application file for complete search history.

(56) References Cited

U.S. PATENT DOCUMENTS

| | | | |
|---|---|---|---|
| 6,097,832 A | 8/2000 | Guillotel et al. | |
| 6,876,702 B1 | 4/2005 | Hui et al. | |
| 6,968,008 B1 | 11/2005 | Ribas-Corbera et al. | |
| 6,981,119 B1 * | 12/2005 | Lepak ................... | G06F 12/023 710/68 |

(Continued)

OTHER PUBLICATIONS

Holland, James M., U.S. Appl. No. 15/483,146, filed Apr. 10, 2017, US Application, Drawings, and E-Ack Receipt attached 47 pages, not yet published.

*Primary Examiner* — Ayman A Abaza
(74) *Attorney, Agent, or Firm* — International IP Law Group, P.L.L.C.

(57) ABSTRACT

A system for lossless pixel compression for random video memory access is described herein. The system includes an encoder and a decoder. The system also includes a memory that is to store instructions and that is communicatively coupled to the encoder and decoder. Further the system includes a processor. The processor is coupled to the camera, the display, and the memory. When the processor is to execute the instructions, the processor is to predict a data value based on values of local neighbors and generate an error term based on the predicted data value. The processor is also to losslessly compress a plurality of cachelines based on the error term and predictions.

24 Claims, 7 Drawing Sheets

500B

(56) References Cited

U.S. PATENT DOCUMENTS

| | | | |
|---|---|---|---|
| 7,551,673 B1 | 6/2009 | Oh et al. | |
| 7,656,561 B2 * | 2/2010 | Molgaard et al. | G06T 1/20 |
| 8,149,915 B1 | 4/2012 | Novotny et al. | |
| 8,934,544 B1 | 1/2015 | Wang | |
| 9,398,297 B2 * | 7/2016 | Gupta | H04N 19/103 |
| 10,068,309 B2 * | 9/2018 | Fries | G06T 1/60 |
| 2001/0021303 A1 | 9/2001 | Bruls et al. | |
| 2003/0091114 A1 | 5/2003 | Vissers et al. | |
| 2003/0229719 A1 | 12/2003 | Iwata et al. | |
| 2004/0111627 A1 * | 6/2004 | Evans | G11B 20/00086 |
| | | | 713/189 |
| 2007/0110160 A1 | 5/2007 | Wang et al. | |
| 2012/0219064 A1 | 8/2012 | Zheng et al. | |
| 2013/0184007 A1 * | 7/2013 | Hategan | H04N 19/105 |
| | | | 358/426.01 |
| 2013/0266072 A1 | 10/2013 | Lee et al. | |
| 2014/0126638 A1 | 5/2014 | Sievers | |
| 2014/0205012 A1 | 7/2014 | Lee et al. | |
| 2014/0286433 A1 | 9/2014 | He et al. | |
| 2015/0178077 A1 * | 6/2015 | Srinivasan | G06F 9/30109 |
| | | | 712/228 |
| 2015/0264348 A1 * | 9/2015 | Zou | H04N 19/70 |
| | | | 375/240.02 |
| 2015/0276496 A1 * | 10/2015 | Kellogg | G01K 5/483 |
| | | | 374/187 |
| 2015/0279055 A1 * | 10/2015 | Kaburlasos | G06T 5/002 |
| | | | 345/587 |
| 2016/0225161 A1 | 8/2016 | Hepper | |
| 2016/0283391 A1 * | 9/2016 | Nilsson | G06F 12/0893 |
| 2016/0353122 A1 * | 12/2016 | Krajcevski | H04N 19/176 |
| 2017/0076419 A1 * | 3/2017 | Fries | G06T 1/20 |
| 2017/0094274 A1 | 3/2017 | Chien et al. | |
| 2017/0178594 A1 * | 6/2017 | Hasselgren | H04N 19/124 |
| 2017/0256024 A1 * | 9/2017 | Abraham | G06T 15/04 |
| 2017/0345121 A1 * | 11/2017 | Seiler | G06T 1/20 |

* cited by examiner

FIG. 4

LOSSLESS PIXEL COMPRESSION FOR RANDOM VIDEO MEMORY ACCESS

CROSS REFERENCE TO RELATED APPLICATIONS

The present application claims the benefit of the filing date of U.S. Provisional Patent Application No. 62/371,133, filed Aug. 4, 2016, which is incorporated herein by reference.

BACKGROUND ART

Data compression techniques are used to encode data using fewer bits than the original data set. Lossless compression enables the encoded data to be completely reconstructed from the compressed data. This complete reconstruction is distinguished from the approximate reconstruction that occurs with lossy compression.

BRIEF DESCRIPTION OF THE DRAWINGS

FIG. 4 is an illustration of pixel position and mapping based on memory format;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
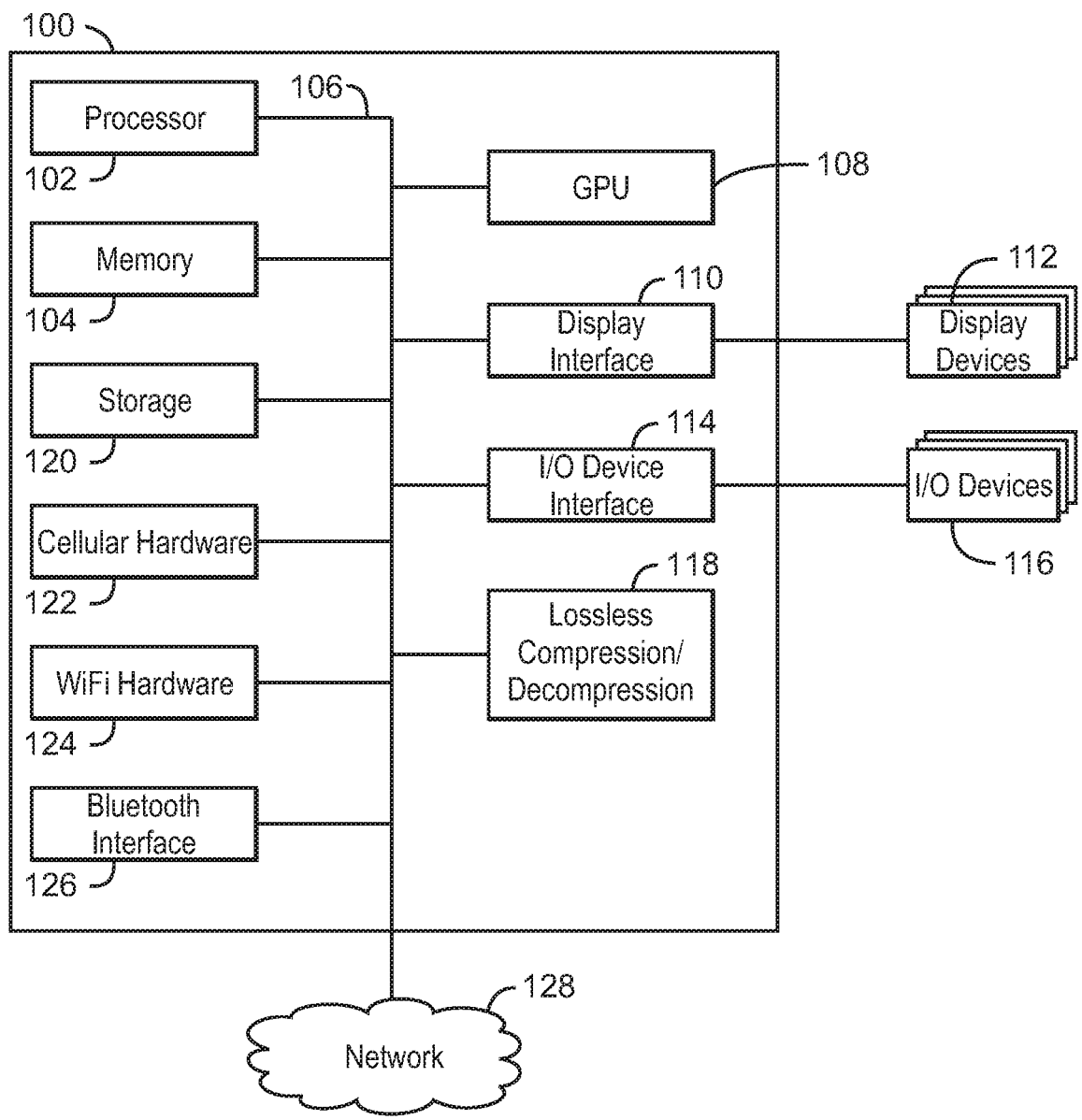
FIG. 1 is a block diagram of an electronic device that enables lossless pixel compression for random video access.

The present techniques losslessly compress video memory to reduce power and increase performance of video workloads such as decoding, playback, encoding and transcoding. The lossless compression is adapted to support random access patterns.

In embodiments, a group of uncompressed cachelines is compressed to less than or equal to a smaller number of nominal cachelines compressed according to other techniques. In some cases, the small number of nominal cachelines are compressed in a manner that reduces power and increases performance of video workloads such as decoding, playback, encoding and transcoding workloads. The lossless compression is adapted to support random access patterns. In embodiments, a prediction scheme is used to achieve optimal compression for video applications in a lossless fashion using a two dimensional (2D) pixel predictor and a simplified binarization table based on the magnitude of the error.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device 100 that enables lossless pixel compression for random access. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes video data via lossless pixel compression.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

A lossless memory compressor 118 may compress data using an error based on a predicted data value. In embodiments, each data value may be predicted via a prediction scheme. In embodiments, the data values are pixel component values. A pixel prediction scheme is any method used to determine a predictive value of a pixel. The predicted value may include color components such as the chrominance and luminance of the YUV color space. Pixel color components may also be the red, green, or blue of the RGB color space. The pixel component values may be predicted using neighboring pixel values. In embodiments, a plane prediction scheme is used to predict the pixel component values. As used herein, a pixel component value may include any data that is are used in the drawing of eventual pixels (such as intermediate data buffers which are arranged in a one dimensional (1D) or 2D fashion and have strong dependencies on local neighbors). An error associated with the predicted pixel component values may be determined, and compression or decompression may be performed via an exponential Golomb table using the calculated error. The present techniques compress cachelines such that any cacheline in memory can be randomly accessed.

The electronic device may also include a storage device 120. The storage device 120 is a physical memory such as a hard drive, an optical drive, a flash drive, an array of drives, or any combinations thereof. The storage device 120 can store user data, such as audio files, video files, audio/ video files, and picture files, among others. The storage device 120 can also store programming code such as device drivers, software applications, operating systems, and the like. The programming code stored to the storage device 120 may be executed by the CPU 102, GPU 108, or any other processors that may be included in the electronic device 100.

The CPU 102 may be linked through the bus 106 to cellular hardware 122. The cellular hardware 122 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 128 without being tethered or paired to another device, where the network 128 is a cellular network.

The CPU 102 may also be linked through the bus 106 to WiFi hardware 124. The WiFi hardware is hardware according to WiFi standards (standards promulgated as Institute of Electrical and Electronics Engineers' (IEEE) 802.11 standards). The WiFi hardware 124 enables the electronic device 100 to connect to the Internet using the Transmission Control Protocol and the Internet Protocol (TCP/IP), where the network 128 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 126 may be coupled to the CPU 102 through the bus 106. The Bluetooth Interface 126 is an interface according to Bluetooth networks (based on the Bluetooth standard promulgated by the Bluetooth Special Interest Group). The Bluetooth Interface 126 enables the electronic device 100 to be paired with other Bluetooth enabled devices through a personal area network (PAN). Accordingly, the network 128 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
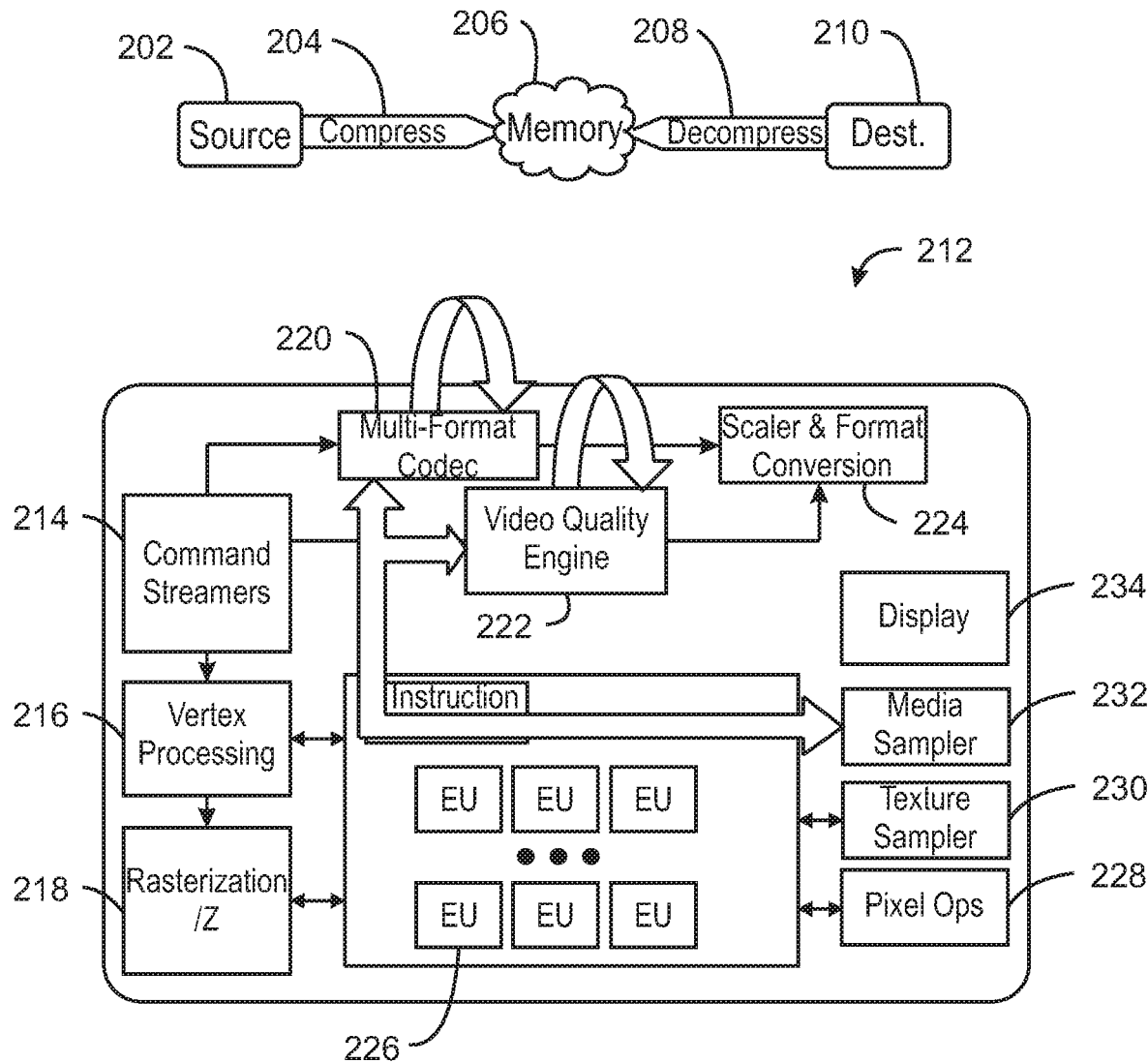
FIG. 2 is a block diagram illustrating media memory bandwidth compression.

FIG. 2 is a block diagram illustrating media memory bandwidth compression. In embodiments, media engines may pass frame data amongst each other or themselves for most usages. This traffic is evident on both the processor and the DRAM, thereby consuming power and reducing concurrency. In embodiments, the system may include a lossless compression protocol between media engines. This can result in two times up to N-times the bandwidth reduction without introducing artifacts or reducing performance. This can be opportunistically managed by a driver.

Data processing includes obtaining data from a source 202, compressing 204 the data, and then storing the data in a memory 206. The data can be decompressed 208 and then sent to the destination 210.

As illustrated in FIG. 2, a graphics subsystem 212 may include command streamers 214, vertex processing 216, and rasterization 218. The graphics subsystem 212 may also include a multi-format codec 220, a video quality engine 222, and a scaler and format conversion 224. Further, the graphics subsystem 212 may include a plurality of execution units 226, pixel ops 228, a texture sampler 230, a media sampler 232, and a display 234.

Cacheline groupings are received and predictions are formed at each location based on the local neighbors using the plane prediction. Those predictions are subtracted from the source to generate the error terms. The errors/error terms are then binarized by a lookup table based on the magnitude of the error. A bit to mark whether this grouping (or subgrouping) was compressed or not is generated and written to memory on a control surface (which may be padded onto the sides of the original surface that is being compressed). In embodiments, the bit that is set in response to plurality of cachelines compressed can be stored on the right or bottom of the same memory surface as the original pixels, in essence embedding that information.

Decoding may be performed in a reverse manner, starting with a lookup of the control surface to determine if one or more cachelines should be requested from memory to satisfy the requestor. If the cacheline is compressed, a seed pixel which is uncompressed is received followed by a contiguous grouping of magnitude and error terms. These are decoded and generate error terms which are used to correct from the prediction of already known pixels up to that location. The process repeats until all pixels are decoded. The lookup table is very small to minimize hardware complexity while offering the most frequent magnitudes compression as compared to the original uncompressed bits.

In embodiments, the decoding of the upper or lower compressed cacheline can be performed implicitly as the lower compressed cacheline starts at the lowest bit while the first bit of the upper compressed cacheline starts at the highest bit of the compressed cacheline and is read from the most significant bit (MSB) to the least significant bit (LSB). The key here is simplicity, otherwise the decoder could not determine the location of where the upper compressed cacheline would be within the cacheline if it was needed to decode only the upper compressed cacheline. By coming from bottoms up and tops down, the endpoints are always known because the size of the cacheline is known (64B for example has LSB at bit 0 and MSB at bit 511). The pair of cachelines that are joined in the compressed cacheline can be independently decoded if necessary because the lower cacheline starts at the LSB and increments from there while the upper cacheline starts at the MSB and decrements from there. In cases where more than 2 cachelines are compressed into a single cacheline, a midpoint can be specified which can be done recursively to define binary tree of midpoints which are all independently decodable.

Bandwidth reduction comes from one of two cases: while decoding compressed groupings of cachelines, the other cachelines which are present can also be decoded and stored locally which can be used if a future request needs that other cacheline (hence a transaction to memory is suppressed, saving bandwidth). Alternatively, the compressed cacheline can be stored in a cache and decompressed (again, suppressing a transaction to memory). Lastly, based on the memory format, the closest pixel in the cacheline may not be of the same channel as the current pixel, and this scheme adjust the prediction distances based on surface format mappings to achieve better compression.

Figure 3:
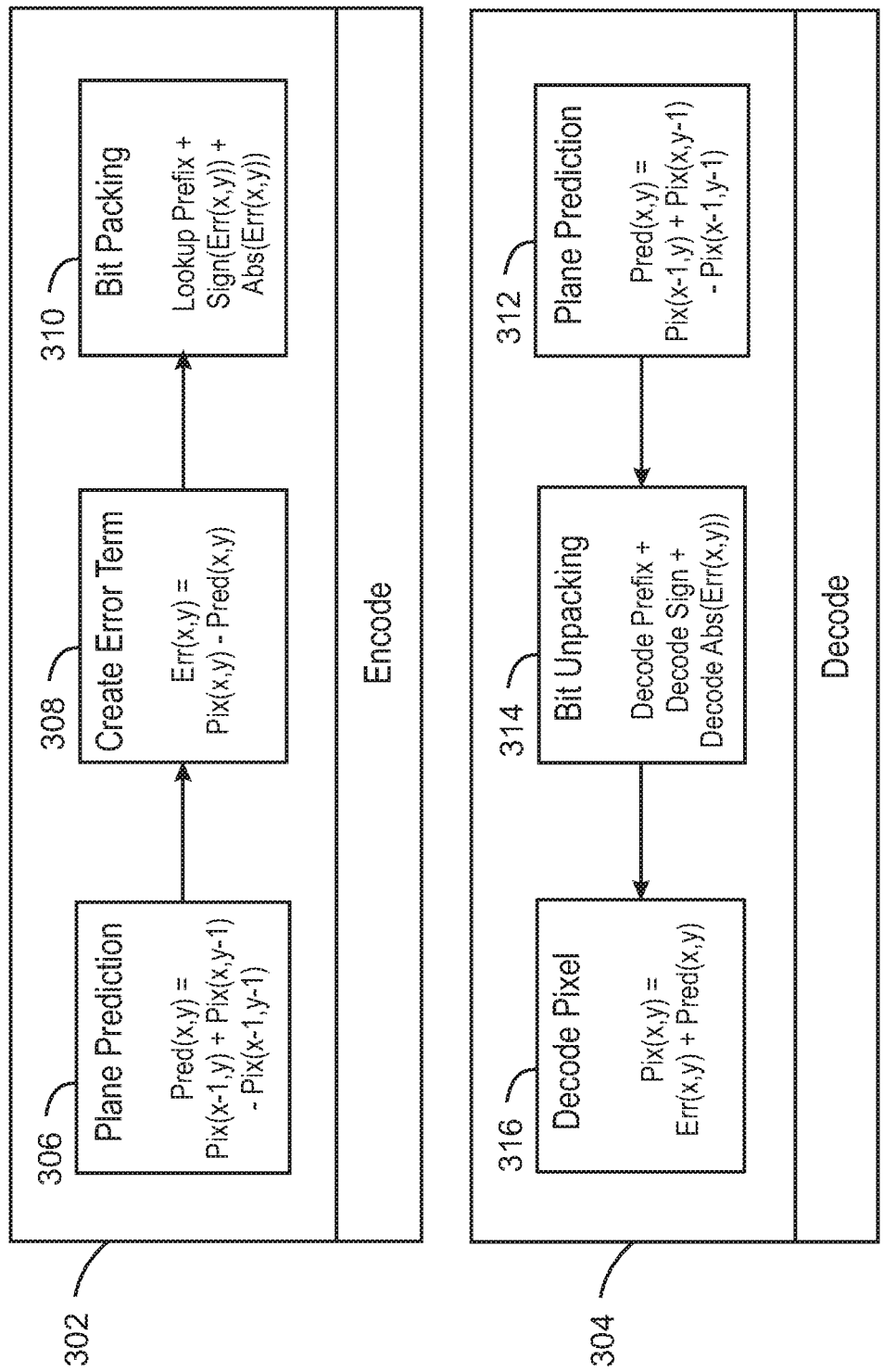
FIG. 3 is a process flow diagram of an encoding scheme and a decoding scheme.

FIG. 3 is a process flow diagram 300 of an encoding 302 scheme and a decoding 304 scheme. The encoding scheme 302 includes a plane prediction 306. Plane prediction may determine plane groups of a frame based on pixel information of the frame. For example, predictions may be made based on intra-plane correlations. In particular, each pixel can be predicted using the information of previously encoded pixels. The following equation finds a prediction for pixel (x, y) using the value of pixel (x−1, y) immediately to the left of pixel (x, y), pixel (x, y−1) immediately below pixel (x, y), and pixel (x−1, y−1) to the left and below pixel (x, y).

$$Pred(x,y)=pix(x-1,y)+pix(x,y-1)-pix(x-1,y-1)$$

For ease of description, the present techniques are described using a plane prediction scheme. However, any prediction scheme may be used. However, the present techniques use the predicted value to generate an error term. In embodiments, the smaller the error term, the less total bits that are used during bit packing. Thus, the prediction scheme may be selected as the scheme that generates the smallest error term.

The error term may be created at block 308. The error term may be found according to the following equation:

$$Err(x,y)=Pix(x,y)-Pred(x,y)$$

Bit packing may occur at block 310, according to the following equation:

$$Lookup\ Prefix+Sign(Err(x,y))+Abs(Err(x,y))$$

The decoding scheme 304 includes plane prediction 312, bit unpacking 314, and decode pixel 316. The plane prediction 312 can be performed according to the following equation:

$$Pred(x,y)=pix(x-1,y)+pix(x,y-1)-pix(x-1,y-1)$$

Bit packing may occur at block 314, according to the following equation:

$$Decode\ Prefix+Decode\ Sign+Decode\ Abs(Err(x,y))$$

Decoding pixels at block 316 may be performed according to the following equation:

$$Pix(x,y)=Err(x,y)+Pred(x,y)$$

A universal code may be used to map integers onto binary codewords. Whatever the true probability distribution on integers, as long as the distribution is monotonic, the expected lengths of the codewords are within a constant factor of the expected lengths that the optimal code for that probability distribution would have assigned. Table 1 is a simplified exponential Golomb table as used with data compression described herein:

TABLE 1

| Level | Abs(Delta) | Prefix | Sign | Delta | Total Bits |
| --- | --- | --- | --- | --- | --- |
| 0 | 0 | 1 | — | — | 1 |
| 1 | 1, 2 | 01 | X | X | 4 |
| 2 | 3, 4, 5, 6 | 001 | X | XX | 6 |
| 3 | Else | 000 | — | XXXXXXXX | 11 |

In embodiments, Table 1 describes the compression that can be achieved during bit packing. In Table 1, the $\log_2(x)$ of the delta value is obtained to determine the applicable level. The delta value is the error term as created at block 308. In the present techniques, the absolute value of the delta value is rarely above six, so those values result in a level 3. In embodiments, the simplified exponential Golomb table is static. For example, the tables used at block 310 and 314 are static, constant tables such that the decoder and encoder will use the same table and no updated tables need to be transmitted.

Consider a transmission value of 31 bits, where the $\log_2(31)$ results in 5 bits needed to describe 31 during the bit packing at block 310. The prefix can be found on Table 1 and 5 bits would be needed, resulting in a prefix of four 0's and a 1. According to the level, a signed value will also be transmitted via a signed bit. To transmit the exact value of 31, 10 bits are sent: 5 bits for the prefix, 1 bit for the sign, and then 4 bits for the delta—10 bits total. While the goal is to transmit the value of 31 via 5 bits, 10 bits would be used to transmit this value via the exponential-Golomb table.

The above example is a worst-case scenario. Most often, the error bit value that is to be transmitted based on the plane prediction is quite low. For example, starting with an 8-bit value per component in an uncompressed memory buffer, each time an error of equal to zero is achieved the result is at least an 8-to-1 compression on that particular pixel. If the error happens to be a 1 or a 2 based on Table 1, that error would use 4-bits for transmission. In this case, the compression ratio is 2-to-1. In the case of an error of size 3, 4, 5, or 6, then 6 bits are transmitted instead of the original 8 bits. Here, the compression ratio is 8-to-6. Only in a case where the prediction error exceeds an absolute value of 6 does the worst case expansion occur. In the worst case, a sign is not transmitted the original 8 bits for the original pixel value are packed and transmitted. In embodiments, the compression is a result of the prediction typically being on level 0, 1, or 2. By using the plane predictor, the absolute error is always a small value in traditional video.

In embodiments, this exponential Golomb coding essentially achieves at a variable compression where the lower the error, the lesser the number of bits that are transmitted. The exponential Golomb coding herein is based on the magnitude of the value to be compressed. As a result, the smaller the magnitude of the value, the more compression that occurs. Once the error value is high, expansion occurs. During bit packing 310 and bit unpacking 314 the prefix look at the Golomb table includes taking the $\log_2(x)$ of the error value. The $\log_2(x)$ function will give the magnitude of the bits to be packed/unpacked.

In embodiments, the sign of the error value is also packed because an over prediction is positive while an under prediction is negative. The sign or the error is packed/unpacked and all other bits of the error are dropped, leaving the absolute value of the error. The absolute value of the error is left, which can be represented by the number of bits in the delta column of Table 1.

In embodiments, a context prediction scheme can be used in place of or alongside the plane prediction. For example, based on the cacheline to be compressed, the exponential Golomb table may be dynamically created. Under normal scenarios, zero is the most probable error term because the prediction scheme is very good. A simplified exponential Golomb table may be regenerated per region after analyzing a very complicated block of pixels. The code of the regenerated exponential Golomb table may be redistributed to obtain a higher compression based on the analyzed pixels. In such a scenario, the regenerated exponential Golomb table is transmitted along with the compressed cachelines, as the table is dynamic.

Figure 4:
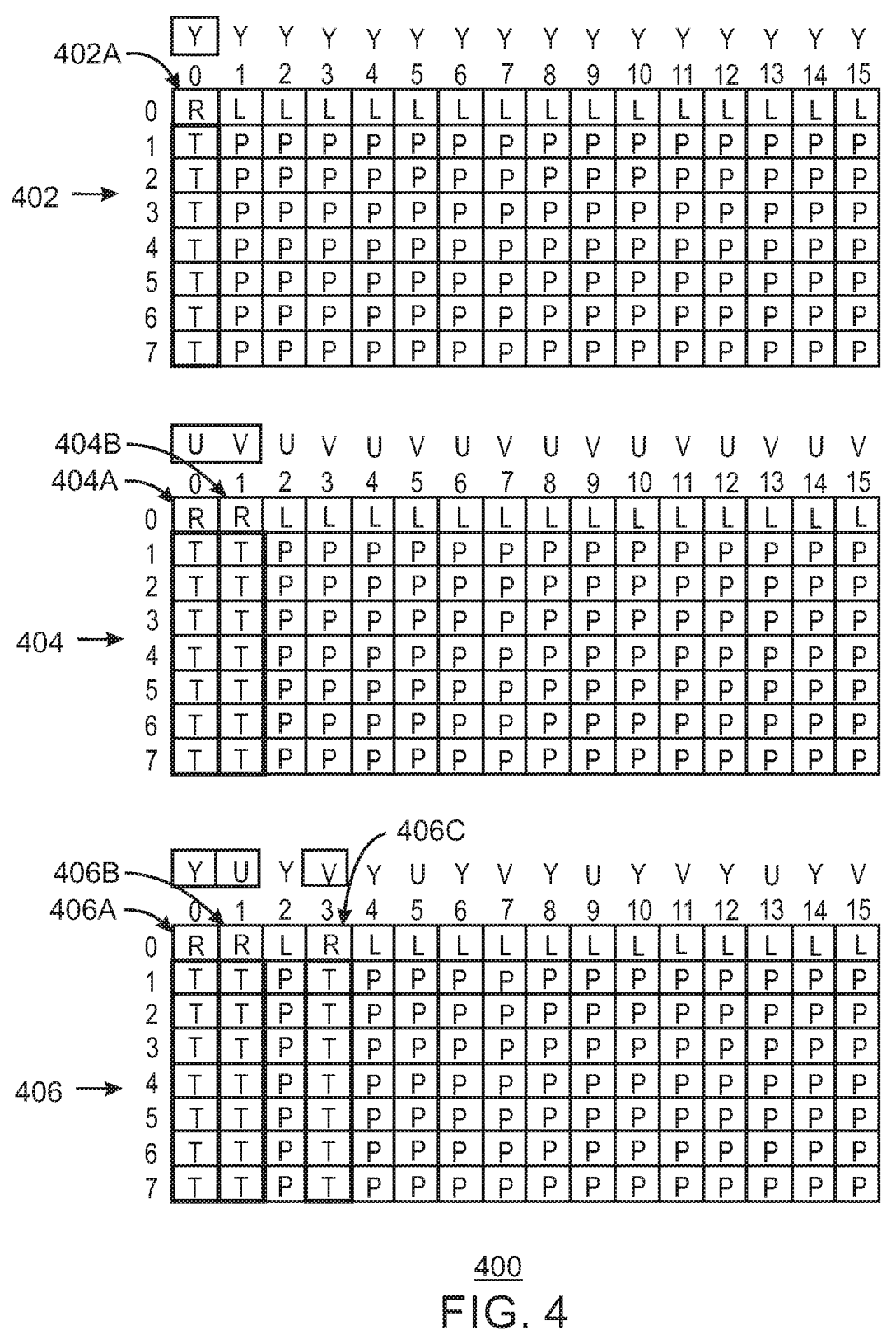

FIG. 4 is an illustration of pixel position and mapping based on memory format (R=seed, L=left prediction, T=top prediction, P=plane prediction). For the example of FIG. 4, the memory data format is YUV. In some YUV data, the resolutions are not the same between all three-color components. Accordingly, data from different components may be stored on the memory plane in separate locations. Block 402 illustrates the storage of the Y-color components. Block 404 illustrates the storage of the UV color components. In another example, block 406 illustrates storing all color components together by interleaving the color components on the same memory plane. In embodiments, block 406 is an illustration of a YUV2 memory format.

In the first case 402, the seed value (R) 402A has to be transmitted originally because it is the start of the prediction. For prediction along the top row of block 402, the pixel to the left (L) is the only pixel available when walking each block from left to right. Thus, on the top row of 402, prediction occurs in one dimension based on the pixel to the left. Similarly, for prediction along the left-most column of block 402, the pixel to the top (T) is the only pixel available when walking each block from left to right. Thus, on the left-most column of 402, prediction occurs in one dimension based on the pixel to the top. Plane prediction (P) is available for the remaining pixel locations in block 402. Note that all pixel values in block 402 are on the same plane.

In block 404, those pixels are not on the same plane, as block 404 includes U-components and V-components. In block 404, the U values are correlated to other U values and the V values are correlated to other V values. Thus, two seed values (R) are transmitted for each of the U-components and the V-components. The seed values 404A and 404B are transmitted originally for each of the U-components and V-components. For prediction along the top row of block 404, the pixel to the left (L) is the only pixel available when walking each block from left to right for each of the U-components and V-components. Thus, on the top row of 404, prediction occurs in one dimension based on the pixel to the left. Similarly, for prediction along the two left-most columns of block 404, the pixel to the top (T) is the only pixel available when walking each block from left to right to predict each of the U-components and V-components. Thus, for the two left-most columns of 404, prediction occurs in one dimension based on the pixel to the top. Plane prediction is available for the remaining pixels in block 404. In embodiments, block 402 and block 404 form an NV:12 memory format.

In block 406, the pixels are not on the same plane, as block 406 includes Y-components, U-components, and V-components. In block 406, the Y values are correlated to other Y values, the U values are correlated to other U values, and the V values are correlated to other V values. Thus, three seed values (R) are transmitted for each of the Y-components, U-components, and the V-components. The seed values 406A, 406B, and 406C are transmitted originally for each of the Y-components, U-components, and the V-components. For prediction along the top row of block 406, after each component has a seed value, the pixel to the left (L) is the only pixel available when walking each block from left to right for each of the Y-components, U-components, and the V-components. Thus, on the top row of 406, prediction occurs in one dimension based on the pixel to the left. Similarly, for prediction along the two left-most columns of block 406 and the fourth left-most column, the pixel to the top (T) is the only pixel available when walking each block from left to right to predict each of the Y-components, U-components, and the V-components. Thus, for those three columns of 406, prediction occurs in one dimension based on the pixel to the top. Plane prediction is available for the remaining pixels in block 406.

The present techniques have been described using the YUV color space. However, the present techniques may apply to any color space. For example, the RGBA color space may be used. An RGBA color value is specified with red (R), green (G), blue (B), and alpha (A). The alpha parameter is a number between 0.0 (fully transparent) and 1.0 (fully opaque). In the RGBA case, the pixel component values may be "packed" together as a 32-bit double word for each pixel location. As such, the prediction scheme for each color plane would be 4-bytes away (R1 would be predicted from R0 which would be 4 bytes to the left, same for G1 to G0, B1 to B0, and A1 to A0, where A is the alpha channel).

Additionally, for ease of description, the present techniques assume 8-bits per component value. However, the present techniques may be scaled for 7-, 9-, 10-, 12- or any other number of bits per pixel component. For example, in a in the 16-bit scheme, the 16-bit value can be divided into an upper half and a lower half, and predictions can be made on those halves. Thus, instead of predicting pixel values 1-byte away, the predicted values are 2-bytes away.

For example, one scheme to handle 10-bits per component value would apply the upper 8 most significant bits via the prediction\error processes, and then send the 2 least significant bits as uncompressed. Specifically, the lowest bits typically are the most "noisy" and have the worst correlation to the neighbors. Thus, transmitting those noisy bits as 2-bits appended onto the regular 8-bit prediction process for the top 8-bits of the supposed 10-bit color component value. This can be expanded for 12-bits as well by predicting the upper 8-bits, and transmitting the lower 4-least significant bits uncompressed. In embodiments, by sending some bits as 1:1, no actual compression is achieved for those bits, however, by in essence 'filtering out' the noisy bits, the prediction scheme works much better for the remaining bits as they will have an "error" of 0 much more frequently than the case where the prediction scheme attempts to compare the whole 10-bit or 12-bit values to their neighbors (where in those cases the error would be exactly 0 much less frequently).

Figure 5A:
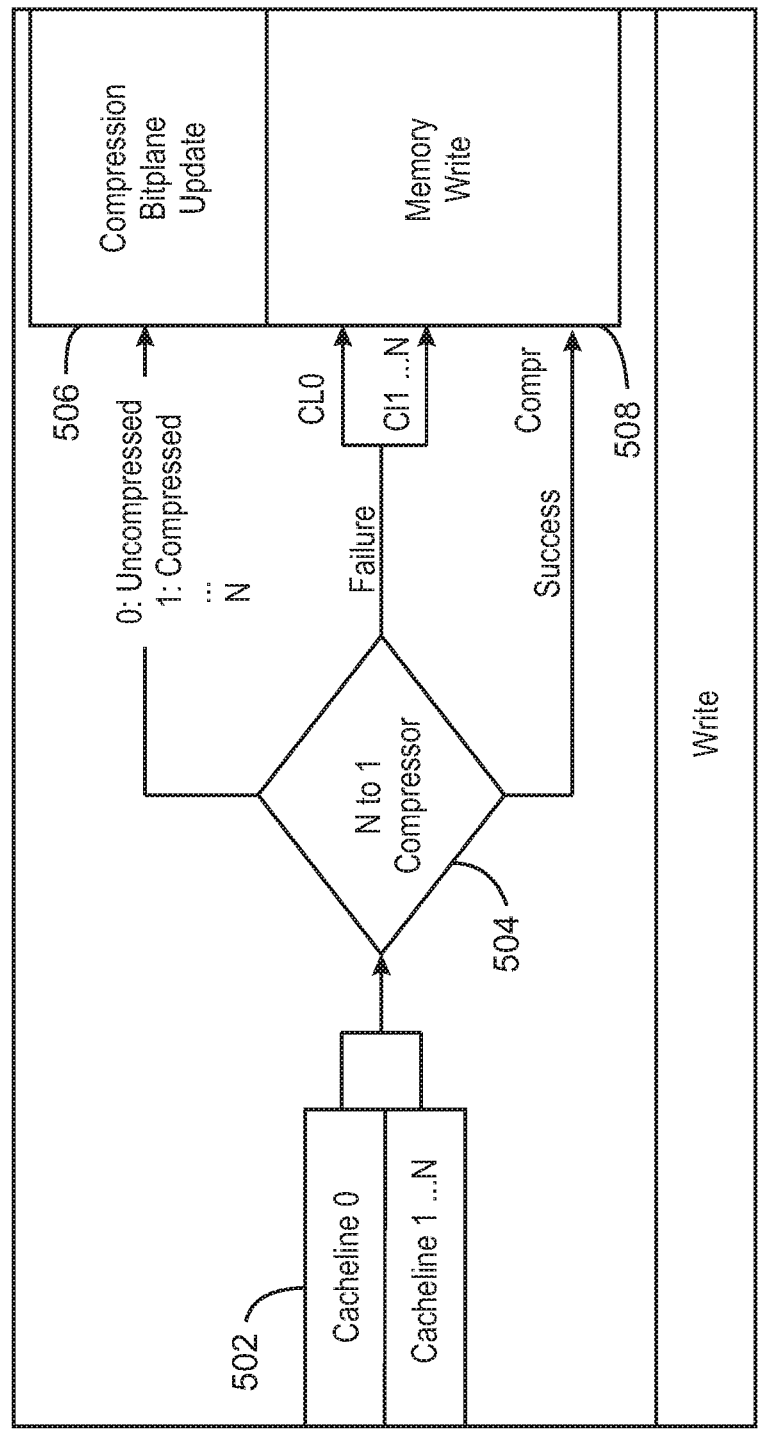
FIG. 5A is a block diagram of a write.

FIG. 5A is a block diagram of a write 500A. At block 502, cachelines 0 . . . N are obtained. At block 504, an N-to-1 compressor may be applied. Depending on the N-to-1 compressor at block 504, a compression bitplane update may occur at block 506, or a memory write may occur at block 508. A failure at the N-to-1 compressor results in each cacheline (CL0 and CL1) being written to memory 508 without any compression. This may be the case when the exponential-Golomb table results in expansion at level 3. A success at the N-to-1 504 compression results in a compressed pixel component being written to the memory 508. Additionally, a compression bitplane tracks, for each cacheline, if the compression is successful or unsuccessful.

Figure 5B:
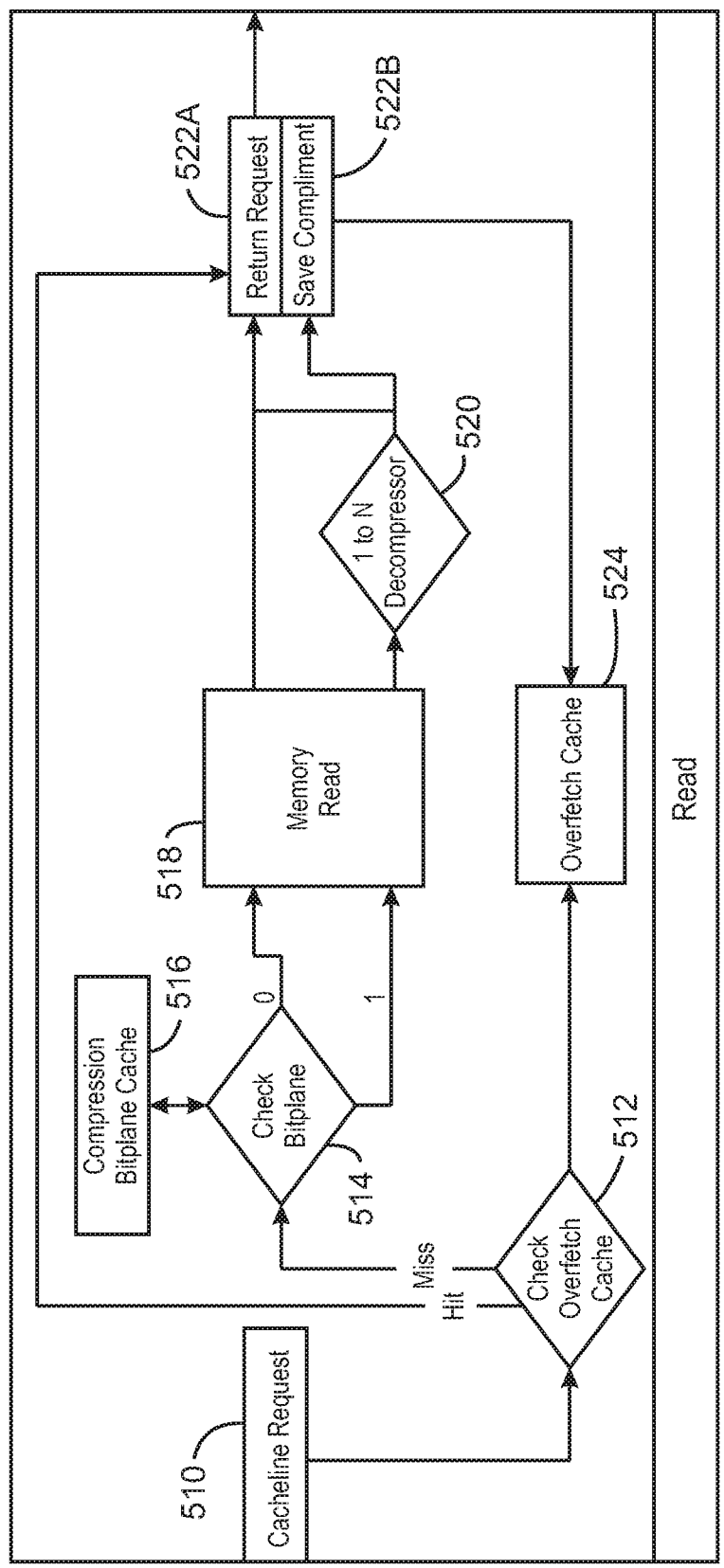
FIG. 5B is a block diagram of a read.

FIG. 5B is a block diagram of a read 500B. At block 510, a cacheline request is performed. At block 512, an overfetch cache is checked. In response to the check overfetch cache, a check bitplane 514 may be performed, or the overfetch cache may be accessed at block 524. In response to a bitplane check at block 514, it is determined if the requested cacheline from block 510 was ever compressed. The determination on if the requested cacheline was compressed determines how each cacheline is read from memory 518.

For example, if the requested cacheline was not compressed and the bitplane contains a 0 for that cacheline, it can be directly read from memory at block 520 and returned to the requestor at block 522A. However, if the cacheline was compressed, the bitplane contains a 1 for that cacheline. The data is read from memory 518 and returned to the requestor 522A. The compliment of the decompressed data is also saved at 522B. The compliment includes the other cacheline that was compressed with the original requested cacheline. Thus, the other cacheline may be written to an overfetch cache at block 524. Accordingly, before a cacheline request is used to check the bitplane, the overfetch cache is checked at block 512 to determine if the requested cacheline has been previously fetched and decompressed due to a previous request for a nearby cacheline. If there is a hit in the overfetch cache, the request is returned at block 522A. A miss at the overfetch cache results in the bit plane being checked for compression. Alternatively, when the compressed cachelines are retrieved from memory, the compressed cacheline (compliment) that was not requested may be stored in a compliment cache and decompressed as necessary. Thus, the compliment cacheline is not decompressed until necessary and the overfetch cache is not necessary.

In the case of compression/decompression from 2-to-1 and 1-to-2, the compression scenarios are simplified. For example, consider a scenario where 4 cachelines are attempted to be compressed, and the results are more diverse than the 2 cacheline case. Specifically, 4 cachelines could be compressed all the way to a single cacheline in the best case scenario. Other times, 4 cachelines could be compressed into 2 or 3 cachelines. Those would still offer compression as compared to the 4 cachelines being always uncompressed. In essence, the bitplane is more diverse in that case as 2-bits could be used to mark the state of 4 cacheline compression entities (4:4, 4:3, 4:2, 4:1). The bitplane could also be even more fine-grained to denote on a per-cacheline basis if 2 cachelines can be compressed together where the other 2 cachelines are left uncompressed.

In each of FIGS. 5A and 5B, for ease of description an N-to-1 compressor and a 1-to-N decompressor are illustrated. The N value represents the cachelines being compressed. FIGS. 5A and 5B are described as compressing/decompressing 2 cachelines. However, N may have any value. For example, N may be four, resulting in four cachelines.

Figure 6:
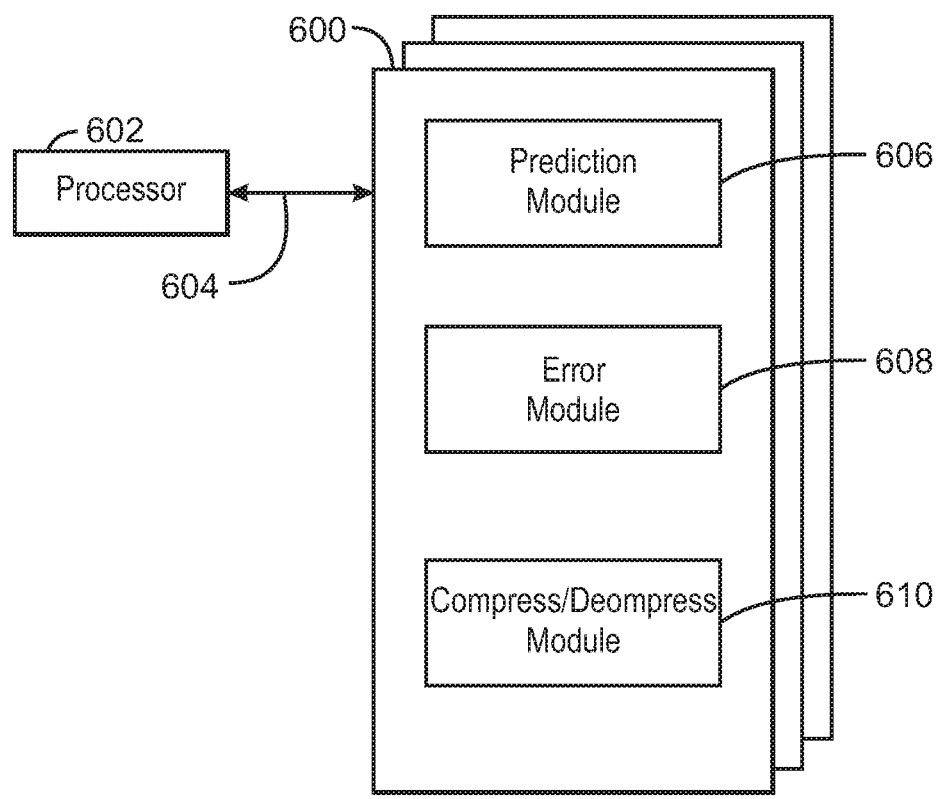
FIG. 6 is a block diagram showing a medium that contains logic for lossless compression for random video memory access.

FIG. 6 is a block diagram showing a medium 600 that contains logic for lossless compression for random video memory access. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-610 configured to perform the techniques described herein. For example, a prediction module 606 may be configured to predict a pixel component value. In embodiments, plane prediction is used to predict the pixel component values. An error module 608 may be configured to calculate the error associated with the predicted pixel component values. A compress/decompress module 610 compress/decompress the pixel component values based on the error and an exponential Golomb table. In some embodiments, the modules 606-610 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Example 1 is a system for lossless pixel compression for random video memory access. The system includes an encoder; a decoder; a memory that is to store instructions and that is communicatively coupled to the encoder and decoder; and a processor communicatively coupled to the camera, the display, and the memory, wherein when the processor is to execute the instructions, the processor is to: predict a data value based on values of local neighbors; generate an error term based on the predicted data value; losslessly compress a plurality of cachelines based on the error term and predictions.

Example 2 includes the system of example 1, including or excluding optional features. In this example, the error is calculated by subtracting an actual data value from a predicted data value.

Example 3 includes the system of any one of examples 1 to 2, including or excluding optional features. In this example, the data value is predicted by via a plane prediction scheme.

Example 4 includes the system of any one of examples 1 to 3, including or excluding optional features. In this example, the system includes obtaining seed values to predict the data value.

Example 5 includes the system of any one of examples 1 to 4, including or excluding optional features. In this example, compression is performed by bit packing a prefix, a sign bit, and an absolute error value. Optionally, the prefix and the sign bit are obtained from an exponential Golomb table. Optionally, the exponential Golomb table is adaptive based on a content of cachelines to be compressed.

Example 6 includes the system of any one of examples 1 to 5, including or excluding optional features. In this example, the processor includes a media engine that is to losslessly compress a plurality of cachelines based on the error terms and predictions.

Example 7 includes the system of any one of examples 1 to 6, including or excluding optional features. In this example, the lossless compression of a plurality of cachelines results in a bandwidth reduction.

Example 8 includes the system of any one of examples 1 to 7, including or excluding optional features. In this example, a random access of losslessly compressed 2D image data is supported.

Example 9 includes the system of any one of examples 1 to 8, including or excluding optional features. In this example, each compressed cacheline can be explicitly decodable by designation of binary tree of midpoints.

Example 10 is a method for lossless pixel compression for random video memory access. The method includes predicting a data value based on values of local neighbors; generating an error term based on the predicted data value; losslessly compressing a plurality of cachelines based on the error term and the predicted data value.

Example 11 includes the method of example 10, including or excluding optional features. In this example, the error is calculated by subtracting an actual data value from a predicted data value.

Example 12 includes the method of any one of examples 10 to 11, including or excluding optional features. In this example, the data value is predicted by via a plane prediction scheme.

Example 13 includes the method of any one of examples 10 to 12, including or excluding optional features. In this example, the method includes obtaining seed values to predict the data value.

Example 14 includes the method of any one of examples 10 to 13, including or excluding optional features. In this example, compression is performed by bit packing a prefix, a sign bit, and an absolute error value. Optionally, the prefix and the sign bit are obtained from an exponential Golomb table. Optionally, the exponential Golomb table is adaptive based on a content of cachelines to be compressed.

Example 15 includes the method of any one of examples 10 to 14, including or excluding optional features. In this example, the processor includes a media engine that is to losslessly compress a plurality of cachelines based on the error terms and predictions.

Example 16 includes the method of any one of examples 10 to 15, including or excluding optional features. In this example, the lossless compression of a plurality of cachelines results in a bandwidth reduction.

Example 17 includes the method of any one of examples 10 to 16, including or excluding optional features. In this example, a random access of losslessly compressed 2D image data is supported.

Example 18 includes the method of any one of examples 10 to 17, including or excluding optional features. In this example, each compressed cacheline can be explicitly decodable by designation of binary tree of midpoints.

Example 19 includes the method of any one of examples 10 to 18, including or excluding optional features. In this example, losslessly compressing a plurality of cachelines comprises compressing whole cachelines, partial cachelines, or any combination thereof.

Example 20 is an apparatus for lossless pixel compression for random video memory access. The apparatus includes a data predictor to predict a current data value based on neighboring values; an error term generator to generate an error term based on the predicted current data value; a compressor to compress a plurality of cachelines based on the error term and the predicted current data value.

Example 21 includes the apparatus of example 20, including or excluding optional features. In this example, the error is calculated by subtracting an actual data value from a predicted data value.

Example 22 includes the apparatus of any one of examples 20 to 21, including or excluding optional features. In this example, the data value is predicted by via a plane prediction scheme.

Example 23 includes the apparatus of any one of examples 20 to 22, including or excluding optional features. In this example, the data value is predicted by via a context prediction scheme.

Example 24 includes the apparatus of any one of examples 20 to 23, including or excluding optional features. In this example, random access into the plurality of compressed cachelines is performed by specifying at least one midpoint during compression, wherein the at least one midpoint indicates an independently decodable data value.

Example 25 includes the apparatus of any one of examples 20 to 24, including or excluding optional features. In this example, the plurality of cachelines is a pair of cachelines, and a first cacheline begins at a least significant bit and increments, and a second cacheline begins at a most significant bit and decrements.

Example 26 includes the apparatus of any one of examples 20 to 25, including or excluding optional features. In this example, compression is performed by bit packing a prefix, a sign bit, and an absolute error value. Optionally, the prefix and the sign bit are obtained from an exponential Golomb table. Optionally, the exponential Golomb table is adaptive based on a content of cachelines to be compressed.

Example 27 includes the apparatus of any one of examples 20 to 26, including or excluding optional features. In this example, compression is performed by bit packing a prefix, a sign bit, and an absolute error value, wherein the prefix and the sign bit are obtained from an exponential Golomb table that is regenerated per region based on a similarity of data values Example 28 includes the apparatus of any one of examples 20 to 27, including or excluding optional features. In this example, the lossless compression of a plurality of cachelines results in a bandwidth reduction.

Example 29 includes the apparatus of any one of examples 20 to 28, including or excluding optional features. In this example, a random access of losslessly compressed 2D image data is supported.

Example 30 includes the apparatus of any one of examples 20 to 29, including or excluding optional features. In this example, losslessly compressing a plurality of cachelines comprises compressing whole cachelines, partial cachelines, or any combination thereof.

Example 31 is a tangible, non-transitory, computer-readable medium. The computer-readable medium includes instructions that direct the processor to predict a data value based on values of local neighbors; generate an error term based on the predicted data value; losslessly compress a plurality of cachelines based on the error term and the predicted data value.

Example 32 includes the computer-readable medium of example 31, including or excluding optional features. In this example, the error is calculated by subtracting an actual data value from a predicted data value.

Example 33 includes the computer-readable medium of any one of examples 31 to 32, including or excluding optional features. In this example, the data value is predicted by via a plane prediction scheme.

Example 34 includes the computer-readable medium of any one of examples 31 to 33, including or excluding optional features. In this example, the computer-readable medium includes obtaining seed values to predict the data value.

Example 35 includes the computer-readable medium of any one of examples 31 to 34, including or excluding optional features. In this example, compression is performed by bit packing a prefix, a sign bit, and an absolute error value. Optionally, the prefix and the sign bit are obtained from an exponential Golomb table. Optionally, the exponential Golomb table is adaptive based on a content of cachelines to be compressed.

Example 36 includes the computer-readable medium of any one of examples 31 to 35, including or excluding optional features. In this example, the processor includes a media engine that is to losslessly compress a plurality of cachelines based on the error terms and predictions.

Example 37 includes the computer-readable medium of any one of examples 31 to 36, including or excluding optional features. In this example, the lossless compression of a plurality of cachelines results in a bandwidth reduction.

Example 38 includes the computer-readable medium of any one of examples 31 to 37, including or excluding optional features. In this example, a random access of losslessly compressed 2D image data is supported.

Example 39 includes the computer-readable medium of any one of examples 31 to 38, including or excluding optional features. In this example, each compressed cacheline can be explicitly decodable by designation of binary tree of midpoints.

Example 40 includes the computer-readable medium of any one of examples 31 to 39, including or excluding optional features. In this example, losslessly compressing a plurality of cachelines comprises compressing whole cachelines, partial cachelines, or any combination thereof.

Example 41 is an apparatus for lossless pixel compression for random video memory access. The apparatus includes instructions that direct the processor to a means to predict a current data value based on neighboring values; a means to generate an error term based on the predicted current data value; a means to compress a plurality of cachelines based on the error term and the predicted current data value.

Example 42 includes the apparatus of example 41, including or excluding optional features. In this example, the error is calculated by subtracting an actual data value from a predicted data value.

Example 43 includes the apparatus of any one of examples 41 to 42, including or excluding optional features. In this example, the data value is predicted by via a plane prediction scheme.

Example 44 includes the apparatus of any one of examples 41 to 43, including or excluding optional features. In this example, the data value is predicted by via a context prediction scheme.

Example 45 includes the apparatus of any one of examples 41 to 44, including or excluding optional features. In this example, random access into the plurality of compressed cachelines is performed by specifying at least one midpoint during compression, wherein the at least one midpoint indicates an independently decodable data value.

Example 46 includes the apparatus of any one of examples 41 to 45, including or excluding optional features. In this example, the plurality of cachelines is a pair of cachelines, and a first cacheline begins at a least significant bit and increments, and a second cacheline begins at a most significant bit and decrements.

Example 47 includes the apparatus of any one of examples 41 to 46, including or excluding optional features. In this example, compression is performed by bit packing a prefix, a sign bit, and an absolute error value. Optionally, the prefix and the sign bit are obtained from an exponential Golomb table. Optionally, the exponential Golomb table is adaptive based on a content of cachelines to be compressed.

Example 48 includes the apparatus of any one of examples 41 to 47, including or excluding optional features. In this example, compression is performed by bit packing a prefix, a sign bit, and an absolute error value, wherein the prefix and the sign bit are obtained from an exponential Golomb table that is regenerated per region based on a similarity of data values Example 49 includes the apparatus of any one of examples 41 to 48, including or excluding optional features. In this example, the lossless compression of a plurality of cachelines results in a bandwidth reduction.

Example 50 includes the apparatus of any one of examples 41 to 49, including or excluding optional features. In this example, a random access of losslessly compressed 2D image data is supported.

Example 51 includes the apparatus of any one of examples 41 to 50, including or excluding optional features. In this example, losslessly compressing a plurality of cachelines comprises compressing whole cachelines, partial cachelines, or any combination thereof.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for lossless pixel compression for random video memory access, comprising:
   an encoder;
   a memory that is to store instructions and that is communicatively coupled to the encoder; and
   a processor communicatively coupled to the encoder and the memory, wherein when the processor is to execute the instructions, the processor is to:
   predict a data value based on values of local neighbors;
   generate an error term based on the predicted data value; and
   losslessly compress a plurality of cachelines based on the error term and predicted data value, wherein random access into the plurality of compressed cachelines is enabled by specifying at least one midpoint during compression that indicates an independently decodable data value.

2. The system of claim 1, wherein the error is calculated by subtracting an actual data value from a predicted data value.

3. The system of claim 1, wherein the data value is predicted via a plane prediction scheme.

4. The system of claim 1, comprising obtaining seed values to predict the data value.

5. The system of claim 1, wherein compression is performed by bit packing a prefix, a sign bit, and an absolute error value.

6. The system of claim 5, wherein the prefix and the sign bit are obtained from an exponential Golomb table.

7. The system of claim 6, wherein the exponential Golomb table is adaptive based on a content of cachelines to be compressed.

8. The system of claim 1, wherein the processor comprises a media engine that is to losslessly compress a plurality of cachelines based on the error terms and predictions.

9. The system of claim 1, wherein the lossless compression of a plurality of cachelines results in a bandwidth reduction.

10. The system of claim 1, wherein the plurality of compressed cachelines comprises two dimensional (2D) image data.

11. The system of claim 1, wherein the at least one midpoint is from a binary tree of midpoints.

12. A method for lossless pixel compression for random video memory access, comprising:
    predicting a data value based on values of local neighbors;
    generating an error term based on the predicted data value; and
    losslessly compressing a plurality of cachelines based on the error term and the predicted data value, wherein random access into the plurality of compressed cachelines is enabled by specifying at least one midpoint during compression that indicates an independently decodable data value.

13. The method of claim 12, wherein the error is calculated by subtracting an actual data value from a predicted data value.

14. The method of claim 12, wherein the data value is predicted via a plane prediction scheme.

15. The method of claim 12, comprising obtaining seed values to predict the data value.

16. The method of claim 12, wherein compression is performed by bit packing a prefix, a sign bit, and an absolute error value.

17. The method of claim 12, wherein the processor comprises a media engine that is to losslessly compress a plurality of cachelines based on the error terms and predictions.

18. The method of claim 12, wherein the lossless compression of a plurality of cachelines results in a bandwidth reduction.

19. The method of claim 12, wherein each compressed cacheline is explicitly decodable by designation of binary tree of midpoints.

20. The method of claim 12, wherein losslessly compressing a plurality of cachelines comprises compressing whole cachelines, partial cachelines, or any combination thereof.

21. An apparatus for lossless pixel compression for random video memory access, comprising:
    a data predictor to predict a current data value based on neighboring values;
    an error term generator to generate an error term based on the predicted current data value; and
    a compressor to compress a plurality of cachelines based on the error term and the predicted current data value, wherein random access into the plurality of compressed cachelines is enabled by specifying at least one midpoint during compression that indicates an independently decodable data value.

22. The apparatus of claim 21, wherein the error is calculated by subtracting an actual data value from a predicted data value.

23. The apparatus of claim 21, wherein the data value is predicted via a plane prediction scheme.

24. The apparatus of claim 21, wherein the data value is predicted via a context prediction scheme.

* * * * *